United States Patent
Walrath

(10) Patent No.: US 9,397,834 B2
(45) Date of Patent: Jul. 19, 2016

(54) SCRAMBLING AN ADDRESS AND ENCRYPTING WRITE DATA FOR STORING IN A STORAGE DEVICE

(75) Inventor: Craig A. Walrath, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 308 days.

(21) Appl. No.: 13/876,441

(22) PCT Filed: Oct. 5, 2010

(86) PCT No.: PCT/US2010/051413

§ 371 (c)(1),
(2), (4) Date: Mar. 27, 2013

(87) PCT Pub. No.: WO2012/047200

PCT Pub. Date: Apr. 12, 2012

(65) Prior Publication Data

US 2013/0205139 A1    Aug. 8, 2013

(51) Int. Cl.
| | |
|---|---|
| *G06F 21/80* | (2013.01) |
| *H04L 9/16* | (2006.01) |
| *G06F 21/78* | (2013.01) |
| *G06F 21/72* | (2013.01) |
| *H04L 9/08* | (2006.01) |
| *G06F 12/14* | (2006.01) |

(52) U.S. Cl.
CPC ............. *H04L 9/16* (2013.01); *G06F 12/1408* (2013.01); *G06F 21/72* (2013.01); *G06F 21/78* (2013.01); *G06F 21/80* (2013.01); *H04L 9/0861* (2013.01)

(58) Field of Classification Search
None
See application file for complete search history.

(56) References Cited

U.S. PATENT DOCUMENTS

| | | | |
|---|---|---|---|
| 4,588,991 A * | 5/1986 | Atalla ........................... | 713/165 |
| 5,237,611 A | 8/1993 | Rasmussen et al. | |
| 5,963,646 A | 10/1999 | Fielder et al. | |
| 6,868,407 B1 | 3/2005 | Pierce | |
| 7,185,205 B2 * | 2/2007 | Launchbury et al. ......... | 713/189 |
| 7,240,345 B2 | 7/2007 | Sueyoshi et al. | |
| 7,372,962 B2 | 5/2008 | Fujimoto et al. | |
| 7,412,605 B2 | 8/2008 | Raley et al. | |
| 7,428,610 B2 | 9/2008 | Pedersen et al. | |
| 7,512,760 B2 | 3/2009 | Takami | |
| 7,526,089 B2 | 4/2009 | Wada et al. | |
| 7,577,852 B2 * | 8/2009 | Okazaki et al. ............... | 713/189 |
| 7,587,603 B2 | 9/2009 | Staring et al. | |
| 8,001,374 B2 * | 8/2011 | Wise ............................. | 713/164 |

(Continued)

FOREIGN PATENT DOCUMENTS

| | | |
|---|---|---|
| CN | 1914852 | 2/2007 |
| CN | 101364249 | 2/2009 |

(Continued)

OTHER PUBLICATIONS

International Searching Authority, International Search Report and Written Opinion, Appln No. PCT/US2010/051411, date of mailing Jul. 1, 2011, 10 p.

(Continued)

*Primary Examiner* — Benjamin Lanier
(74) *Attorney, Agent, or Firm* — Trop, Pruner & Hu

(57) ABSTRACT

An address to access a location in a storage device (106, 204) is received, and the address is scrambled. Write data is encrypted using an encryption key. The encrypted write data is stored in the storage device at a location of the storage device specified by the scrambled address.

16 Claims, 3 Drawing Sheets

(56) References Cited

U.S. PATENT DOCUMENTS

| | | | |
|---|---|---|---|
| 8,572,737 | B2 | 10/2013 | Holloway et al. |
| 8,813,247 | B1* | 8/2014 | Alten ............................ 726/28 |
| 2001/0018743 | A1 | 8/2001 | Morishita |
| 2003/0084308 | A1* | 5/2003 | Van Rijnswou ............ 713/189 |
| 2003/0200334 | A1* | 10/2003 | Grynberg .................... 709/245 |
| 2005/0076228 | A1 | 4/2005 | Davis et al. |
| 2006/0013162 | A1* | 1/2006 | Lim ............................ 370/328 |
| 2006/0120520 | A1 | 6/2006 | Suzuki et al. |
| 2007/0192592 | A1* | 8/2007 | Goettfert et al. ............ 713/162 |
| 2008/0095370 | A1 | 4/2008 | Rose et al. |
| 2008/0152142 | A1 | 6/2008 | Buer et al. |
| 2008/0181406 | A1 | 7/2008 | Iyer et al. |
| 2008/0240422 | A1 | 10/2008 | Ozturk et al. |
| 2008/0301467 | A1 | 12/2008 | Saito |
| 2009/0086965 | A1 | 4/2009 | Glendinning |
| 2009/0113217 | A1 | 4/2009 | Dolgunov et al. |
| 2009/0172415 | A1 | 7/2009 | Takeda |
| 2009/0300372 | A1 | 12/2009 | Lee et al. |
| 2009/0319801 | A1 | 12/2009 | Aciicmez et al. |
| 2010/0095133 | A1 | 4/2010 | Peter et al. |
| 2010/0115286 | A1 | 5/2010 | Hawkes et al. |
| 2010/0138670 | A1 | 6/2010 | Shinbori et al. |
| 2011/0064217 | A1 | 3/2011 | Fry |
| 2012/0017097 | A1* | 1/2012 | Walrath ....................... 713/190 |
| 2013/0198528 | A1 | 8/2013 | Walrath |
| 2013/0205139 | A1 | 8/2013 | Walrath |

FOREIGN PATENT DOCUMENTS

| | | |
|---|---|---|
| CN | 101542968 | 9/2009 |
| EP | 0856818 A2 | 5/1998 |
| JP | 2003195758 | 7/2003 |
| KR | 20030002448 | 1/2003 |
| WO | WO-2008013154 | 1/2008 |
| WO | WO-2009136944 | 11/2009 |
| WO | WO-2010110780 | 9/2010 |
| WO | WO-2012047200 | 4/2012 |

OTHER PUBLICATIONS

International Searching Authority, International Search Report and Written Opinion, Appln No. PCT/US2010/051413, date of mailing Jun. 7, 2011, 8 p.

Moore, et al, "Improving Smart Card Security Using Self-Timed Circuits", Asynchronous Circuits and Systems, 2002. Proceedings. Eighth International Symposium on pp. 211,218; Apr. 8-11, 2002.

US Office Action dated Aug. 7, 2014; cited in U.S. Appl. No. 13/877,129; 21 pages.

US Final Office Action dated Dec. 24, 2014; cited in U.S. Appl. No. 13/877,129; 36 pages.

theamazingking.com, Block Ciphers, May 2010 (3 pages).

tuancom.wordpress.com/2006/02/27/xor/—Tuan's Blog, XOR, 2006 (2 pages).

* cited by examiner

SCRAMBLING AN ADDRESS AND ENCRYPTING WRITE DATA FOR STORING IN A STORAGE DEVICE

CROSS-REFERENCE TO RELATED APPLICATION

This application is a national stage application under 35 U.S.C. §371 of PCT/US2010/051413, filed Oct. 5, 2010.

BACKGROUND

An electronic device typically includes a storage device to store data. The storage device can be a volatile memory device used to temporarily store various types of data, including user or application data, machine-readable instructions, and so forth. Alternatively, the storage device can be a persistent storage device such as a disk-based storage device or a non-volatile memory device. The data stored in a storage device can include sensitive or confidential data, such as security keys, user credentials, financial information, personal information, and so forth. If the electronic device is stolen or otherwise accessed in an unauthorized manner, a hacker may attempt to retrieve the content of the storage device to obtain sensitive or confidential information stored in the storage device.

BRIEF DESCRIPTION OF THE DRAWINGS

Some embodiments are described with respect to the following figures.

DETAILED DESCRIPTION

In accordance with some implementations, techniques or mechanisms are provided to protect content of a storage device in an electronic device, which can be a computer, personal digital assistant, electronic appliance, storage server, mobile telephone, or other type of electronic device. In some examples, the storage device can be a volatile memory device implemented with dynamic random access memory (DRAM) or static random access memory (SRAM) technology. In alternative examples, the storage device can be a non-volatile memory device such as a flash memory device. As yet further examples, the storage device can be a disk-based storage device, such as a hard disk drive or optical disk drive. In other examples, other types of storage devices can be used.

Figure 1:
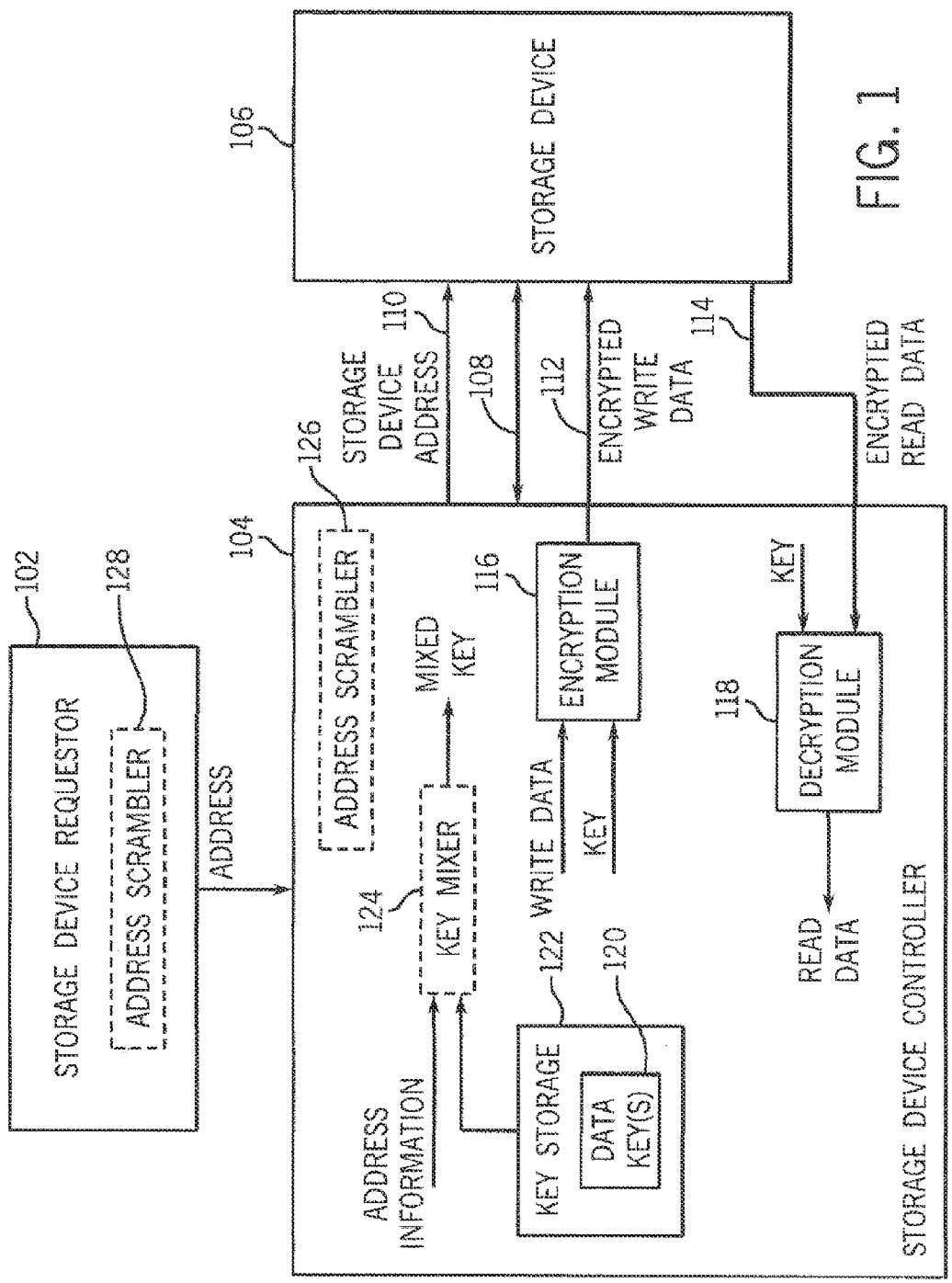
FIGS. 1 and 2 are block diagrams of example arrangements incorporating some embodiments.

FIG. 1 depicts an example arrangement that includes a storage device requestor 102, a storage device controller 104 (provided with data protection mechanisms according to some implementations), and a storage device 106. The storage device requestor 102 is able to access (read or write) the content of the storage device 106 through the storage device controller 104. Examples of the storage device requester 102 include a processor, an input/output (I/O) controller, or other type of requester.

A storage device bus 108 interconnects the storage device controller 104 and storage device 106. The storage device bus 108 includes a control portion (for carrying control signals), an address portion (for carrying address signals), and a data portion (for carrying data read from or written to the storage device 106). The control, address, and data portions of the bus 108 are shown separately as an example. Various implementations could have these as separate connections, but the portions can also be multiplexed or sent on common bus signals, and so forth. Also, the control, address, and/or data portions can be implemented as wired or wireless connections. In wireless implementations, the control, address, and/or data portions are transmitted using a wireless protocol.

As shown in FIG. 1, the storage device controller 104 can provide a storage device address 110 to access a location of the storage device 106. For a write operation, write data 112 can be provided to the storage device 106, and for a read operation, read data 114 can be retrieved from the storage device 106. To protect content of the storage device 106, write data 112 sent to the storage device 106 from the storage device controller 104 includes encrypted write data. If data is read from a location of the storage device 106 that is protected by encryption, the corresponding read data 114 is encrypted read data.

For further protection of the content of the storage device 106, the storage device address 110 can be a scrambled address. Note that not all locations in the storage device 106 have to be protected by data encryption and address scrambling—in some examples, certain locations of the storage device 106 are not subject to data encryption and/or address scrambling. For example, data encryption and/or address scrambling can be selectively enabled or disabled for specific storage locations. The selective enabling/disabling of data encryption and/or address scrambling can be accomplished by including a command field with a storage access command to specify whether or not the corresponding storage location is to be protected by data encryption and/or address scrambling. Alternatively, other mechanisms can be used for selectively enabling/disabling data encryption and/or address scrambling for specific storage locations, such as by use of configuration information, an application programming interface (API), and so forth.

Using both address scrambling and data encryption provides an enhanced level of protection for data stored in the storage device 106. In this way, the likelihood of a hacker being able to retrieve content of protected data in the storage device is reduced. In trying to retrieve data from the storage device 106, the hacker may steal the electronic device, remove the storage device 106 from the electronic device, or otherwise gain unauthorized access to the storage device 106 (either physically or electronically).

Although FIG. 1 shows just one storage device controller 104 implemented with data protection mechanisms to protect data in the storage device 106, note that there can be additional storage device controller(s) with similar data protection mechanisms for other storage device(s).

The storage device controller 104 includes an encryption module 116 to encrypt (un-encrypted) write data, and a decryption module 118 to decrypt encrypted read data 114. The decryption module 118 outputs decrypted read data.

Each of the encryption module 116 and decryption module 118 is supplied with a key to perform the respective encryption or decryption. The key can be a data key 120 stored in key storage 122. Alternatively, the key provided to the encryption module 116 and decryption module 118 can be a mixed key output by a key mixer 124. The key mixer 124 mixes a data key 120 from the key storage 122 with address information to output the mixed key. The mixing of the data key with the address information can be an exclusive-OR of the data key and the address information. Other types of mixing of the data key and address information can be used in other implementations. Note that in FIG. 1, depicting the key mixer 124 in dashed profile means that in some examples, the key mixer 124 is not provided in the storage device controller 104.

The encryption that is applied by the encryption module 116 can be one of various types of encryption. For example, a fast encryption technique can be an exclusive-OR (XOR) technique in which an encryption key is XOR-ed with write data. A benefit of using the XOR-based encryption technique is that it is relatively fast and can support relatively fast access speeds of the storage device 106 without adding delay to the write and read paths.

The encryption module 116 can thus apply the following exclusive-OR operation: $A \otimes K = C$, where A represents the input plaintext data (write data) that is XOR-ed with the encryption key K (data key 120 or mixed key) to produce encrypted write data (C).

To perform decryption, the encrypted read data (C) can be XOR-ed with the encryption key K to recover the original plaintext (A), according to: $C \otimes K = A$.

In alternative implementations, instead of using the XOR-based encryption technique, a higher-level encryption technique can be used. For example, the higher-level encryption can be Advanced Encryption Standard (AES) encryption. The AES encryption key is more difficult to hack than a key used in XOR encryption. However, AES encryption can come with increased circuit complexity (since more circuits have to be used to implement AES encryption), which can lead to increased access times or increased complexity in addressing the issue of increased access time involved in performing AES encryption. Other types of higher-level encryptions can be used in other examples.

In the key mixer 124, the address information that is mixed with the data key 120 can include one or a combination of the following: (1) at least a portion of an initial (un-scrambled) physical address provided by the storage device requestor 102, (2) at least a portion of a scrambled physical address, and (3) at least a portion of virtual address information (scrambled virtual address or un-scrambled virtual address). A "virtual address" refers to a logical address that is part of a virtual address space typically used by higher-level components of an electronic device, such as an operating system or a file system. The virtual address space is typically larger than the physical address space that defines the actual available storage locations in the storage device 106.

Each data key 120 stored in the key storage 122 can be a randomly generated key, which can be generated by the storage device controller 104 itself or by a component outside the storage device controller 104. For example, a data key can be generated by system boot code, such as basic input/output system (BIOS) code, which performs various initialization functions when an electronic device is first started. Alternatively, the data key can be generated by a management engine that is part of the chipset of an electronic device. As yet another alternative, the data key can be generated based on user input. As another example, the data key can be generated by a processor, a trusted platform module, or other component. The data key can also be received over a network connection or a management bus to which the electronic device is connected. Generally, the data key is generated without using data that can be discovered by reverse engineering a component in the electronic device.

Random data keys can be generated based on output of a random number generator. Also or alternatively, random data keys can be generated based on dates and/or time. To enhance security, the data key that is used to perform the encryption and decryption by the encryption module 116 and decryption module 118, respectively, changes with each system reset or reboot. Alternatively, a different data key can be generated when the electronic device resumes from a lower power state, such as a standby state, a hibernation state, or other lower power state. As yet a further alternative, encryption refresh cycles can be employed in which a new data key is generated in each new encryption refresh cycle.

The key storage 122 is a volatile storage device that loses its content upon loss or removal of power. For example, the key storage 122 can be a register in the storage device controller 104, or alternatively, the key storage 122 can be part of the storage device 106. The key storage 122 can be a write-only/write-once storage device (e.g., register) that is reset in response to a predefined event, such as the electronic device being shut down, being reset, entering into a lower power state, starting a new encryption refresh cycle, and so forth. A write-only storage means that the key storage 122 cannot be read by a component outside the storage device controller 104, and a write-once storage means that the key storage 122 can only be written once during each predefined interval (e.g., during the on time of an electronic device between resets, reboots, or power cycles; during a particular refresh cycle interval; and so forth).

As noted above, the storage device address 110 provided by the storage device controller 104 to access a location in the storage device 106 can be a scrambled address. Employing address scrambling allows for an additional layer of protection on top of the protection provided by the encrypting data stored in the storage device 106. The address scrambling can be performed by an address scrambler 126 in the storage device controller 104 in some examples. In alternative examples, instead of providing the address scrambler 126 in the storage device controller 104, an address scrambler 128 can be provided as part of the storage device requestor 102, or alternatively, the address scrambler 128 can be provided between the storage device requester 102 and storage device controller 104 (in other words, the address scrambler can be provided in a component that is separate from the storage device requestor 102 and the storage device controller 104).

Scrambling an initial address can be performed using any one of various techniques. For example, address bits of the initial address can be switched around. Alternatively, an initial address can be scrambled by using a key, such as a randomly generated key. The key for scrambling the address can be a data key 120 (stored in the key storage 122) or a different key. The key can be mixed with or otherwise applied to the initial address to generate the scrambled address. Alternatively, address scrambling can be performed by hashing the initial address to produce a hash value that represents the scrambled address. As yet another alternative, a data structure, such as a table, can be stored to map input initial addresses to output addresses, where the output addresses are considered the scrambled addresses. Other techniques can be used in other implementations.

In implementations where a key is used to scramble an address, there can be various possible scenarios (some of which are set forth below). In a first scenario, the address scrambler 126 or 128 can scramble an initial physical address to form a scrambled address using a data key 120. The key mixer 124 mixes the initial physical address with the data key 120 to form a mixed key, and the mixed key can be used by the encryption module 116 and decryption module 118 to encrypt or decrypt data, respectively.

A second scenario involves the address scrambler 126 or 128 scrambling an initial physical address with an address key that is different from a data key 120. The initial physical address is mixed by the key mixer 124 with the data key 120 to form a mixed key that is used to encrypt or decrypt data.

In a third scenario, the address scrambler 126 or 128 can scramble an initial physical address using a different technique than a technique used for encrypting data. For example, a first encryption technique is used to scramble the initial physical address with a key (data key or address key different from the data key) to form the scrambled address, while a second encryption technique is used to encrypt write data with a data key (instead of a mixed key) to output encrypted write data.

In a fourth scenario, a scrambled address can be generated using an address key that is different from a data key. The scrambled address is mixed with the data key to form a mixed key to encrypt write data.

In a fifth scenario, a scrambled address can be generated using a data key. The scrambled address is mixed with the data key to form a mixed key to encrypt write data.

In a sixth scenario, a scrambled address can be generated using an encryption technique different from the encryption technique used for encrypting write data. In this scenario, a data key is used to encrypt the data, instead of a mixed key.

In a seventh scenario, en initial physical address can be scrambled to form a scrambled address, but a virtual address (or a scrambled virtual address) can be mixed with a data key to provide the mixed key for encrypting the write data. A variant of this scenario is to use the virtual address (or a scrambled virtual address) as the data key to encrypt write data.

There can be numerous other scenarios. Moreover, some scenarios can involve combinations of multiple ones of the above scenarios.

Figure 2:
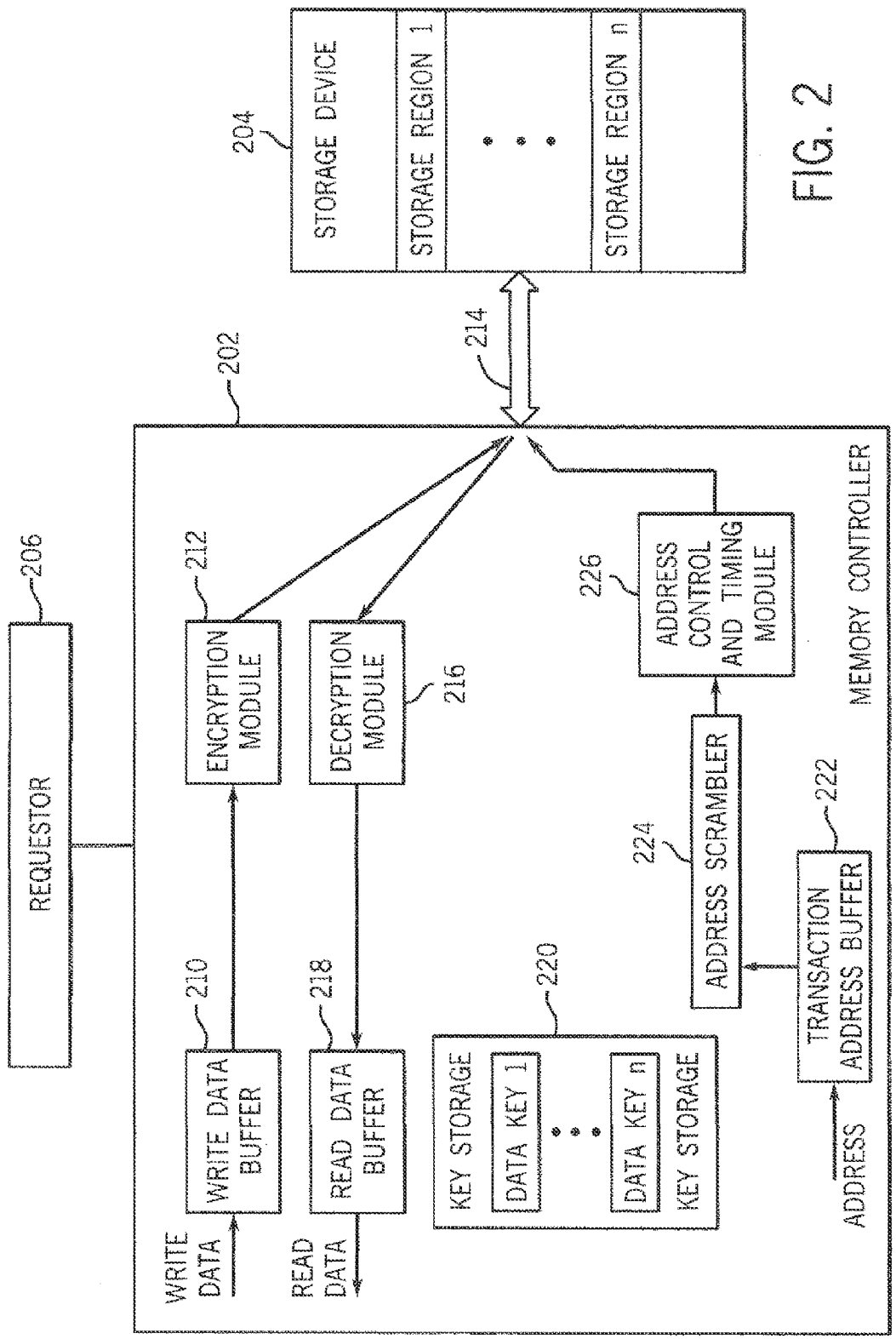

FIG. 2 shows another example arrangement that includes a memory controller 202 that is connected to a memory device 204 (note that in different examples, the memory controller 202 can be replaced with a storage device controller, while the memory device 204 is replaced with a storage device). The memory controller 202 implements memory protection mechanisms (similar to those noted above) to protect data to be stored in the memory device 204. The memory device 204 can represent a single device, or a combination of multiple devices (e.g., a single memory chip or multiple memory chips, or a single memory module or multiple memory modules). Note that implementations according to FIG. 2 do not use key mixing to mix a data key with address information to form a mixed key to encrypt write data.

In alternative implementations, a key mixer such as the key mixer 124 of FIG. 1 can be added to the memory controller 202 of FIG. 2.

The memory protection mechanisms implemented by the memory controller 202 include a data encryption mechanism to encrypt write data that is to be stored into the memory device 204. The memory protection mechanisms of the memory controller 202 also include an address scrambling mechanism to scramble an address that specifies a location in the memory device 204.

FIG. 2 further shows a requestor 206 (e.g., processor, I/O controller, etc.) coupled to the memory controller 202. The requester 206 is able to issue read or write requests to the memory controller 202 to read or write data in the memory device 204.

For a write operation, as shown in FIG. 2, the memory controller 202 includes a write data buffer 210 to store incoming write data. An encryption module 212 applies encryption on the write data from the write data buffer 210, and provides the encrypted write data for storage at the memory device 204 over a memory bus 214. The memory bus 214 includes a control portion (having control signals), an address portion (containing an address), and data portion (containing data to be transferred between the memory controller 202 and the memory device 204).

For a read operation, read data is retrieved from the memory device 204 and provided to a decryption module 216. Note that the data read from the memory device 204 can be encrypted data, such that the decryption module 216 applies decryption to the encrypted read data to output decrypted read data to a read data buffer 218, where the read data can be provided to the requester 206.

The encryption or decryption applied by the encryption module 212 and decryption module 216 can be based on a data key stored in key storage 220 in the memory controller 202. As depicted in FIG. 2, the key storage 220 can store multiple data keys (represented as "data key 1" . . . "data key where n", where n≥2). In some implementations, different memory regions of the memory device 204 can be encrypted using different data keys. As depicted in FIG. 2, the memory device has multiple memory regions ("memory region 1" . . . "memory region n"). The different memory regions can represent different portions of a particular memory device. The multiple memory regions can alternatively represent different memory devices. Thus, in an electronic device having multiple memory devices, a first data key can be used to protect data in a first memory device, a second data key can be used to protect data in a second memory device, and so forth. In further examples, there can be different types of memory devices in the electronic device, in which case different data keys are used to protect data stored in the different types of memory devices. Thus, for example, a first data key is used to protect data in a first type of memory device (e.g., a DRAM-based memory device), a second data key is used to protect data in a second type of memory device (e.g., a flash memory device), and so forth. Note also that there can be cache memory in the electronic device, such that another data key is used to protect the cache memory.

Additionally, note also that different data keys can be used for different memory regions depending on how the respective memory regions are used. For example, one of the memory regions can be an operating system (OS) area for storing data or instructions associated with an operating system. Another memory region can store data associated with a non-OS program, such as user or application data.

Alternatively, different data keys can be used during different modes of operation of the electronic device, where the different modes can refer to different levels of security, for example.

In other implementations, different levels of encryption can be applied to different memory regions. For example, XOR-based encryption can be applied for a first memory region, while AES encryption or some other higher-level encryption is applied for a different memory region.

In addition, in some implementations, different address scrambling are used for different memory regions. For example, different keys (data keys or address keys different from the data keys) can be applied to generate different address scramblings. Alternatively, different encryption levels can be applied to provide different address scramblings for the different memory regions.

The different keys and/or different encryption levels and/or different address scramblings to be applied to different memory regions can be configured at build time of the electronic device or during electronic device operation by a user or administrator.

The memory controller 202 also includes a transaction address buffer 222 to store an address associated with a particular transaction (read transaction or write transaction). An address scrambler 224 applies address scrambling on the address from the transaction address buffer 222. The scrambled address is provided from the address scrambler 224 to an address control and timing module 226, which outputs the scrambled address over the address portion of the memory bus 214.

Note that different address scramblings can be performed for different memory regions in the memory device. Thus, for example, an address that accesses a first memory region will be scrambled in a first manner, whereas an address accessing a second memory region is scrambled in a second, different manner.

For example, the different manners of scrambling the address can be based on using different keys for scrambling the different addresses for different memory regions. Alternatively, different hashing functions can be used to scramble the addresses for different memory regions. Also, different address scrambling techniques can be performed for the memory regions that store different types of data, such as user data, graphics data, OS data, and so forth.

By using different data keys and/or different address scramblings for different memory regions, it becomes more difficult to recover keys or a specific address scrambling technique for memory regions that may contain sensitive or confidential data. Note that certain OS data may be known data, such that a hacker can relatively easily reverse engineer a key or a specific address scrambling technique for a OS memory region, based on the known OS data. However, if a different data key and/or address scrambling technique is used for a memory region containing non-OS data (e.g., such as user or application data), then the hacker would be unable to access the content of this other memory region even though the data key and/or address scrambling technique were determined by the hacker for the OS memory region.

In some implementations, note that OS data and non-OS data may be spread out over the memory device 204. If different address scramblings are being applied for the memory region containing OS data versus a memory region containing non-OS data, then the address scramblings are designed such that the resultant scrambled address for a non-OS memory region does not end up being the same as the resultant scrambled address for an OS memory region.

Figure 3:
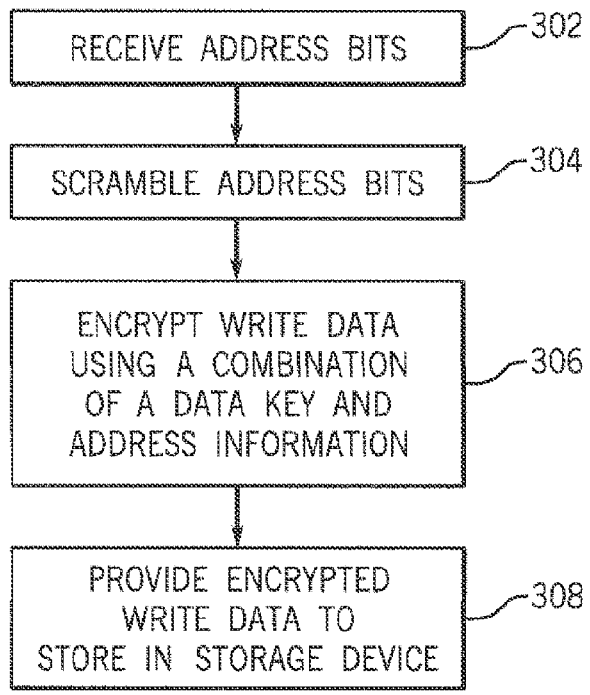
FIGS. 3 and 4 are flow diagrams of processes of protecting content of a storage device, according to some embodiments.

FIG. 3 is a flow diagram of a process performed by a control system. As used here, the control system (or equivalently, "control subsystem") includes processing circuitry that is capable of performing predefined tasks. For example, the control system can include one or a combination of any of the following: the storage device requestor 102 of FIG. 1, storage device controller 104 of FIG. 1, requestor 206 of FIG. 2, and memory controller 202 of FIG. 2.

The control system receives (at 302) address bits, which in the context of FIG. 3 are part of an address associated with a request to write to a storage device. The control system then scrambles (at 304) the address bits. Write data is then encrypted (at 306) using an encryption key that is a combination of a data key and address information, where the address information can include one or a combination of the following: (1) at least a portion of an initial (un-scrambled) physical address, (2) at least a portion of a scrambled physical address, and (3) at least a portion of virtual address information (scrambled virtual address or un-scrambled virtual address).

The encrypted write data is provided (at 308) for storing in the storage device.

Figure 4:
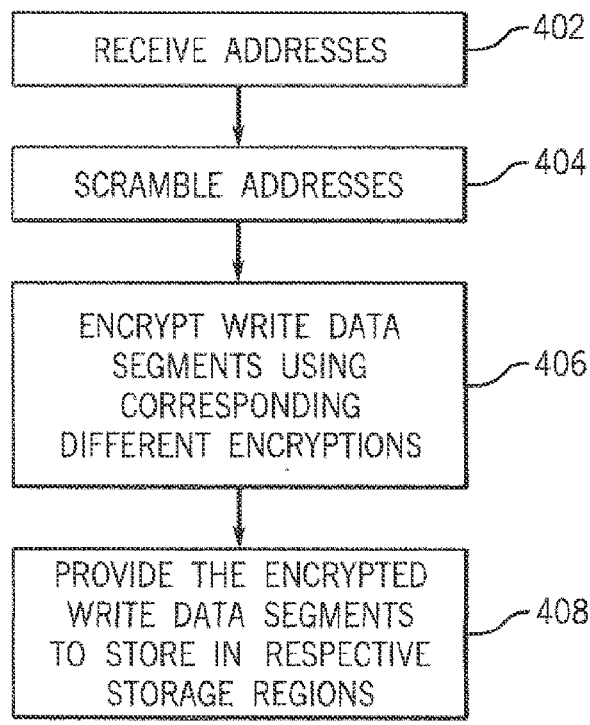

FIG. 4 is a flow diagram of a process of performed by a control system according to alternative implementations. The control system receives (at 402) addresses associated with multiple requests to write to multiple storage regions. The addresses are scrambled (at 404), where scrambling each address refers to scrambling at least a portion of the address. Write data segments associated with the respective write requests are encrypted (at 406) using corresponding different encryptions, where different encryptions can be accomplished using different encryption keys (e.g., different data keys), or using different encryption techniques (e.g., XOR-based encryption, AES encryption, etc.).

The encrypted write data segments are then provided (at 408) for storing in the respective storage regions.

The control system used to implement the process of FIG. 3 or 4 can be implemented with hardware only, or a combination of hardware and machine-readable instructions that are loaded for execution on processing circuitry (which can be part of the requestor 102 or 206 or part of the storage device controller 104 or memory controller 202 in FIG. 1 or 2). Processing circuitry can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media-distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving, by a control system, a storage access command including a command field that selectively enables address scrambling for a storage location;
receiving, by the control system, address bits that define an address used to access the storage location in a storage device;
scrambling, by the control system, the address bits that define the address used to access the storage location for which address scrambling is selectively enabled by the command field;
encrypting, using an encryption key, write data, wherein the encryption key comprises a combination of a first key and address information, where the address information is based on one or a combination of: at least a portion of the received address bits, at least a portion of the scrambled address bits, or at least a portion of virtual address information, wherein scrambling the address bits is based on using a key selected from among the first key and a second key different from the first key; and providing, by the control system, the encrypted write data to store in the storage device at a location of the storage device specified by the scrambled address bits.

2. The method of claim 1, wherein the location in the storage device specified by the address bits prior to the scrambling is different from the location in the storage device specified by the scrambled address bits.

3. The method of claim 1, wherein the combination of the first key and the address information comprises an exclusive-or of the first key and the address information.

4. The method of claim 1, wherein the storage device has plural regions, and wherein different encryption keys are used to encrypt data stored in the respective plural regions.

5. The method of claim 1, wherein the storage device has plural regions, the method further comprising applying different levels of encryption to the respective plural regions.

6. The method of claim 1, wherein the storage device has plural regions, the method further comprising applying different address scramblings for the respective plural regions.

7. The method of claim 1, further comprising:
reading encrypted read data from the storage device; and
decrypting the encrypted read data using the encryption key.

8. A system comprising:
at least one storage device; and
a control subsystem to:
receive a storage access command including a command field that selectively enables address scrambling for a storage location;
scramble addresses for accessing different storage regions of the at least one storage device to form respective scrambled addresses, the different storage regions including the storage location for which address scrambling has been selectively enabled by the command field;
encrypt, using different encryptions, corresponding plural write data segments, wherein the different encryptions are based on use of corresponding different encryption keys, wherein at least one of the encryption keys is a mixture of a data key and a first scrambled address of the scrambled addresses, wherein the first scrambled address is formed from one of: switching around address bits of a respective address; hashing the address bits; and mapping, using a table, the address bits to the first scrambled address; and
provide the encrypted write data segments to store in the respective storage regions specified by the respective scrambled addresses.

9. The system of claim 8, wherein the different encryptions are based on use of corresponding different encryption techniques.

10. The system of claim 8, wherein the different storage regions comprise: (1) different storage regions of one storage device, or (2) different storage regions of different storage devices.

11. The system of claim 8, wherein the different storage regions are to store respective different types of data.

12. The system of claim 8, wherein the control subsystem is configured to communicate at least one of address information, control information, and data information wirelessly to the storage device.

13. A storage device controller for a storage device, comprising:
an address scrambler to, in response to a storage access command including a command field specifying that address scrambling is selectively enabled for a storage location in the storage device, scramble address bits of an address used to access the storage location in the storage device, the scrambling of the address bits based on a first key;
a key mixer to form an encryption key by combining the first key with address information, where the address information is based on at least a portion of the scrambled address bits; and
an encryption module to encrypt write data using the encryption key, and to provide the encrypted write data to store in the storage device at a location of the storage device specified by the scrambled address bits.

14. The storage device controller of claim 13, wherein the storage location in the storage device specified by the address bits prior to scrambling is different from the location in the storage device specified by the scrambled address bits.

15. The method of claim 1, wherein scrambling the address bits based on using the key selected from among the first key and the second key comprises mixing the address bits with the key selected from among the first key and the second key.

16. The storage device controller of claim 13, wherein the scrambling of the address bits based on the first key comprises mixing the address bits with the first key.

* * * * *